United States Patent [19]

Brindoepke et al.

[11] Patent Number: 5,620,751
[45] Date of Patent: Apr. 15, 1997

[54] BINDERS FOR POWDER COATINGS

[75] Inventors: Gerhard Brindoepke, Sulzbach; Dietmar Fink, Taunusstein; Gerd Walz, Wiesbaden, all of Germany

[73] Assignee: Hoechst Aktiengesellschaft, Germany

[21] Appl. No.: 615,433

[22] Filed: Mar. 14, 1996

Related U.S. Application Data

[60] Continuation of Ser. No. 347,055, Nov. 30, 1994, abandoned, which is a division of Ser. No. 111,702, Aug. 25, 1993, abandoned.

[30] Foreign Application Priority Data

Aug. 27, 1992 [DE]  Germany ............... 42 28 514.3

[51] Int. Cl.⁶ ............... C08J 7/04; C08J 7/18
[52] U.S. Cl. ............... 427/506; 427/388.2; 427/389.7; 427/391; 427/393; 427/520; 427/393.5; 522/93; 525/28; 525/440

[58] Field of Search ............... 525/28, 440, 920, 525/934; 522/93; 427/506, 520, 388.2, 389.7, 391, 393, 393.5

[56] References Cited

U.S. PATENT DOCUMENTS

| | | | |
|---|---|---|---|
| 4,134,884 | 1/1979 | Takiyama | 525/38 |
| 4,390,662 | 6/1983 | Ando | 525/28 |
| 5,068,305 | 11/1991 | Meixner | 528/49 |

*Primary Examiner*—Patricia A. Short
*Attorney, Agent, or Firm*—Bierman and Muserlian

[57] ABSTRACT

Binders for powder coatings comprising A) a solid unsaturated polyester and B) a polyurethane comprising (meth)acryloyl groups. These polyester-containing mixtures are distinguished by an improved blocking stability compared with polyurethane alone.

15 Claims, No Drawings

BINDERS FOR POWDER COATINGS

PRIOR APPLICATIONS

This application is a continuation of U.S. patent application Ser. No. 347,055 filed Nov. 30, 1994 which is a division of U.S. patent application Ser. No. 111,702 filed Aug. 25, 1993, both now abandoned.

EP-A-0,410,242 discloses polyurethanes containing (meth)acryloyl groups, which are prepared by reacting A) 40–80 parts by weight of an organic polyisocyanate with B) 15–50 parts by weight of a monohydric alcohol containing (meth)acryloyl groups, and C) 2–20 parts by weight of a further structural component comprising at least one compound which is free from (meth)acryloyl groups and contains groups which are reactive towards isocyanate groups.

These polyurethanes are used as binders in powder coatings; however, these coatings in many cases are of insufficient blocking stability, and it has now been found that the blocking stability of these polyurethanes can be improved by blending them with solid unsaturated polyesters. In addition, these polyesters are less expensive than the said polyurethanes, so that replacing part of the polyurethanes by the polyesters in this way brings about an overall cost saving for the powder coatings.

The invention therefore relates to binders for powder coatings comprising A) a solid unsaturated polyester and B) a polyurethane containing (meth)acryloyl groups.

Preferred polyesters are those containing hydroxyl groups and/or carboxyl groups, which have hydroxyl numbers of from 5 to 120, in particular from 10 to 100, mg of KOH/g, a viscosity of less than 100,000, in particular less than 40,000, mPa's and melting points of from 50° to 130° C., preferably from 65° to 120° C. Their acid values are between 2 and 60, in particular between 2 and 40, mg of KOH/g.

The unsaturated solid polyesters are prepared by the condensation as known per se of unsaturated dicarboxylic acids or their anhydrides, and if desired further saturated dicarboxylic acids, with polyhydric alcohols. The content of unsaturated groups (C=C content) in the polyester should be 2 to 20, preferably 2 to 15 and in particular 2 to 10%.

Particularly suitable unsaturated dicarboxylic acids are maleic acid and fumaric acid, and their anhydrides.

The saturated dicarboxylic acids may be aliphatic, cycloaliphatic, aromatic and/or heterocyclic in nature and may be substituted, for example by halogen atoms, and/or show unsaturation. Examples of these are: succinic acid, adipic acid, suberic acid, azelaic acid, sebacic acid, phthalic acid, terephthalic acid, isophthalic acid, trimellitic acid, pyromellitic acid, tetrahydrophthalic acid, dimethylolpropionic acid, hexahydrophthalic acid, di- and tetrachlorophthalic acid, endomethylenetetrahydrophthalic acid and its hexachloro derivative, glutaric acid, dimeric and trimeric fatty acids, such as oleic acid, if desired as a mixture with monomeric fatty acids; dimethyl terephthalate, bis-glycol terephthalate, and also cyclic monocarboxylic acids, such as benzoic acid, p-tert-butylbenzoic acid or hexahydrobenzoic acid.

Examples of suitable polyhydric alcohols are ethylene glycol, 1,2-propylene glycol, 1,3-propylene glycol, 1,4-butylene glycol, 2,3-butylene glycol, di-β-hydroxyethylbutanediol, 1,6-hexanediol, 1,8-octanediol, neopentyl glycol, cyclohexanediol, 1,4-bis(hydroxymethyl)cyclohexane, 2,2-bis(4-hydroxycyclohexyl)propane, 2,2-bis[4-(β-hydroxyethoxy) phenyl]propane, 2-methyl-1,3-propanediol, glycerol, trimethylolpropane, 1,2,6-hexanetriol, 1,2,4-butanetriol, tris(β-hydroxyethyl) isocyanurate, trimethylolethane, pentaerythritol, quinitol, mannitol and sorbitol, formose and hydroxy alkylation products thereof, methyl glycoside, and also diethylene glycol, triethylene glycol, tetraethylene glycol, polyethylene glycols, dipropylene glycol, tripropylene glycol, polypropylene glycols, dibutylene glycol, polybutylene glycols and xylylene glycol. Monoesters and polyesters of lactones, for example ε-caprolactone, or hydroxycarboxylic acids such as hydroxypivalic acid, ω-hydroxydecanoic acid and ω-hydroxycaproic acid can be employed, as can polyesters of the above-mentioned polycarboxylic acids and/or their derivatives and polyphenols, such as hydroquinone, bisphenol A, 4,4'-dihydroxybiphenyl or bis(4-hydroxyphenyl) sulfone, polyesters modified with fatty acids (oil alkyds) and naturally occurring saturated or unsaturated polyesters, their degradation products or. transesterification products with polyols such as castor oil, tall oil, soya oil and linseed oil, and polyesters of carbonic acid which are obtainable from hydroquinone, diphenylolpropane, p-xylylene glycol, ethylene glycol, butanediol or 1,6-hexanediol and other polyols by conventional condensation reactions, for example with phosgene or diethyl or diphenyl carbonate, or from cyclic carbonates such as glycol carbonate or vinylidene carbonate, by polymerization in a known manner.

Examples of preferred polyesters also include the reaction products of dicarboxylic acids and glycidyl compounds, as described, for example, in DE-A-2,410,513. Examples of glycidyl compounds which can be used in this respect are esters of 2,3-epoxy-l-propanol with monobasic acids containing 4 to 18 carbon atoms, such as glycidyl palmitate, glycidyl laurate and glycidyl stearate or Cardura E10; alkylene oxides having 4 to 18 carbon atoms, such as butylene oxide, and glycidyl ethers such as octylene glycidyl ether. Dicarboxylic acids which can be used here are all polycarboxylic acids as listed above.

Preferred components also include monomeric esters, for example dicarboxylic acid bis(hydroxy alcohol) esters, monocarboxylic acid esters with triols and higher polyols and oligoesters which can be prepared by condensation reactions from raw materials conventional in the chemistry of coatings.

The solid unsaturated polyesters can be obtained in a manner known per se by condensation in an inert-gas atmosphere at temperatures from 100°–260° C., preferably 130°–220° C., in the melt or by an azeotropic procedure, as described for example in Methoden der Organischen Chemie [Methods of Organic Chemistry] (Houben-Weyl), Vol. 14/2, 1–5, 21–23, 40–44, George Thieme Verlag, Stuttgart, 1963 or in C. R. Martens, Alkyd Resins, 51–59, Reinhold Plastics Appl. Series, Reinhold Publishing Comp., New York, 1961.

The second constituent of the binders according to the invention comprises urethanes containing (meth)acryloyl groups, for example, as described in EP-A-410 242. These polyurethanes are obtained by reacting A) 35–80 parts by weight of a polyisocyanate component comprising at least one organic polyisocyanate with B) 15–70 parts by weight of an alcohol component containing (meth)acryloyl groups, and comprising at least one mono- or polyhydric alcohol containing (meth)acryloyl groups, and if desired C) 0–30 parts by weight of a further structural component comprising at least one compound which is free from (meth) acryloyl groups and has groups which are reactive towards isocyanate groups.

These polyurethanes have a melting point in the temperature range from 40° to 180° C. and have a content of olefinic double bonds in the form of (meth)acryloyl groups (calculated as —C=C—, molecular weight =24) of 2 to 13% by weight. These polyurethanes are prepared by reacting the above-mentioned starting components A)–C), which components are preferably chosen in terms of their nature and amount such that the resulting polyurethanes are practically free from isocyanate groups and have a number-average molecular weight of 400 to 10,000. The ratio of equivalents of all the groups which are reactive toward isocyanate groups to the isocyanate groups is accordingly from 0.9–1.1 to 1.1–0.9.

Component A) comprises at least one organic polyisocyanate. Suitable polyisocyanates are any of the organic polyisocyanates which are known from polyurethane chemistry, having isocyanate groups which are attached to aliphatic, cycloaliphatic and/or aromatic structures, which preferably have a molecular weight of 150 to 1000, preferably 168 to 300. Suitable examples are 1-iso-cyanato-3,3,5-trimethyl-5-isocyanatomethylcyclohexane (isophorone diisocyanate, IPDI), tetramethylxylylene diisocyanate (TMXDI), hexamethylene diisocyanate (HDI), trimethylhexamethylene diisocyanate, 4,4'-diisocyanatodicyclohexylmethane, 4,4'-diisocyanatodiphenylmethane and its technical-grade mixtures with 2,4-diisocyanatodiphenylmethane and if appropriate the higher homologs of these diisocyanates, 2,4-diisocyanatotoluene and its technical grade mixtures with 2,6-diisocyanatotoluene, and copolymers of α,α'-dimethyl-meta-isopropenylbenzyl isocyanate (TMI).

Also suitable are biuret-, isocyanurate-, urethane- or urea-modified polyisocyanates based on these simple polyisocyanates. These derivatives generally have a molecular weight of up to about 1000. The preparation of such derivatives is described in, for example, U.S. Pat. Nos. 3,124,605, 3,183,112, 3,919,218 or 4,324,879.

It is preferred to use as component-A) 2,4-diisocyanatotoluene or its technical-grade mixtures with up to 35% by weight, based on the mixture, of 2,6-diisocyanatotoluene, IPDI, TMXDI and/or polyisocyanates obtained by trimerization of IPDI, TMXDI or HDI and containing isocyanurate groups.

Component B) comprises at least one mono- or polyhydric alcohol containing (meth)acryloyl groups. Such alcohols include in particular hydroxyalkyl esters of acrylic acid or methacrylic acid having preferably 2–4 carbon atoms in the hydroxyalkyl radical, such as hydroxyethyl (meth)acrylate, 2-and 3-hydroxypropyl (meth)acrylate, 2-, 3- and 4-hydroxybutyl (meth) acrylate. It is, however, also possible to employ small quantities of reaction products of these hydroxyalkyl acrylates with caprolactone.

However, as an alternative it is also possible to use reaction products of acrylic acid with diepoxides or polyepoxides, for example the diglycidyl ethers of bisphenol A or F, of hexanediol, butanediol or neopentyl glycol and of cyclohexane dimethanol. These products then also possess the properties of component C and can have a chain-lengthening action. Also suitable are trimethylpropane diacrylate and pentaerythritol triacrylate.

Component C) is a compound which has at least two groups which are reactive towards isocyanate groups, in particular at least two, preferably 2–4 and particularly preferably 2–3, alcoholic hydroxyl groups or else, possibly, amine groups. Compounds which are particularly suitable as component C) or as part of component C) have a molecular weight of 62–1000. Examples are ethylene glycol, 1,2- and 1,3-propanediol, neopentyl glycol, glycerol, trimethylolpropane, trishydroxyethyl isocyanurate and pentaerythritol or diethanolamine. Also suitable, although less preferred, as component C) or as part of component C) are the higher molecular weight compounds known per se from polyurethane chemistry which have groups, in particular hydroxyl groups, which are reactive toward isocyanate groups, for example the known polyhydroxypolyethers or polyhydroxypolyesters with a molecular weight above 200. Mention is here made of polycaprolactone or polycarbonatediols or triols. It is also possible, however, to include polyamines, which leads to the formation of urea groups and raises the glass transition temperature of these polyurethanes.

Examples of suitable polyamines are ethylenediamine, propylenediamine, 2 -methylpentamethylenediamine, hexamethylenediamine, trimethylhexamethylenediamine, neopentyldiamine, octamethylenediamine, triacetonediamine, dioxadecanediamine and higher homologs, cycloaliphatic diamines such as 1,2-, 1,3 - or 1,4-cyclohexanediamine, 4,4'-methylenebiscyclohexylamine, 4,4'-isopropylenebiscyclohexylamine, isophoronediamine, tricyclododecenyldiamine, methanediamine, 4,4'-diamino-3,3'-dimethyldicyclohexylmethane, 3-aminomethyl-1-(3-aminopropyl-1-methyl)-4-methylcyclohexane, m-xylylenediamine, N-methylethylenediamine, hydroxyethylamine, hydroxypropylamine, N-aminoethylpiperazine, 2-aminoethylpiperazine, N,N'-dimethylethylenediamine, N,N-dimethylpropylenediamine, aliphatic polyamines such as diethylenetriamine, triethylenetetramine, tetraethylenepentamine, pentaethylenehexamine, iminobispropylamine, methyliminobispropylamine, bis(hexamethylene)-triamine, and tetrapropylenepentamine.

Further suitable amines include those containing hydroxyl groups in addition to secondary or primary amino groups, for example hydroxyethyldiethylenetriamine or bishydroxyethyldiethylenetriamine. Also suitable are monoethanolamine, diethanolamine, aminoethylethanolamine, N-(2-hydroxypropyl)ethylenediamine, mono- or di-(n- or iso)propanolamine, ethylene glycol bispropylamine, neopentanolamine, methylethanolamine, 2-(2-aminoethoxy) ethanol, 3-aminopropyltrialkoxysilane (alkoxy=methoxy, ethoxy or tridecyloxy), 2-amino-2-hydroxymethyl-1,3-propanediol and the like.

Examples of preferred polyurethanes containing (meth) acryloyl groups are the reaction products of trimerized isophorone diisocyanate, containing isocyanate groups, with hydroxylethyl acrylate, or the branched reaction products obtained by reacting isophorone diisocyanate, tetramethylxylylene diisocyanate or diisocyanatotoluene or mixtures thereof with trimethylolpropane, pentaerythritol or trimethylolpropane modified with caprolactone, and subsequently reacting with hydroxyethyl acrylate.

The preparation of the polyurethanes by reacting the said starting components can be carried out in inert solvents, for example acetone, ethyl acetate, butyl acetate or toluene, with preferred reaction temperatures being 20° to 150° C., in particular 20° to 140° C. A preferred procedure comprises initially, in a first reaction step, carrying out the reaction of component A) with component B), followed by the reaction of the resulting reaction product with component C) until the isocyanate content has fallen to below 0.1% by weight. The resulting polyurethane solution in the solvent is then added to water to precipitate the polyurethane, which is then filtered off.

The addition reaction leading to the polyurethane can be accelerated in a known manner using suitable catalysts, such as tin octanoate, dibutyltin dilaurate or tertiary amines such as dimethylbenzylamine. On the other hand, the polyurethane or urethane acrylate obtained as reaction product can be protected, by adding suitable inhibitors and antioxidants such as phenols and/or hydroquinones in amounts of in each case 0.001 to 0.3% by weight, based on polyurethane, against premature and unwanted polymerization. These auxiliaries can be added before, at the same time as and/or after the reaction leading to the polyurethane.

At the end of the reaction the solvent used is removed again. This can be effected by, for example, heating the reaction solution under vacuum at 60°–100° C. The polyurethanes should not contain more than 1–2% residual solvent.

Solvent-free polyurethanes are also obtained by preparing the products in aprotic water-miscible solvents such as ketones (acetone), THF, DMF or dimethyldiglycol and subsequently precipitating these solutions in an excess of water. After filtering off and drying the solid resin which precipitates, these products contain no residual solvent, which leads to a significant improvement in storage stability.

For application in UV-curable powder coatings these polyurethanes containing (meth)acryloyl groups are mixed with the solid unsaturated polyesters. The mixing ratios can be varied within a wide range depending on the desired coating objective; it is possible and preferred for the proportion of one of the two components to be 10 to 95% by weight, the proportion of the other component then making up the shortfall to 100% by weight.

The mixtures of the two components obtained in this manner result in valuable binders for powder coatings. They can be processed as heat-crosslinkable powder clear coats without additional additives (in which case the binder would be identical with the coating agent) or else, preferably, together with the auxiliaries and additives conventional in coatings technology, for example pigments, such as titanium dioxide, levelling agents, such as polybutyl acrylate or silicones, and/or other additives. These mixtures are homogenized in extruders or kneaders at temperatures from about out 80° to 140° C., preferably 100°–120° C. The resulting solid is then milled in a manner known per se and screened to remove coarse fractions, preferably at least those having a particle size greater than 0.1 mm.

The powdered coating compositions prepared in this way can be applied by conventional powder application methods, for example electrostatic powder spraying or fluidized-bed sintering, to the shaped components to be coated. In the case of wood as the substrate it is also possible, for example prior to electrostatic spraying, to apply a conductivity assistant. In general these binders are suitable both for cold and hot coating; in the case of substrates of large surface area, such as wooden or metal panels or paper webs, vertical coating is also possible without the powder caking together. In this method it is possible in some circumstances to forego electrostatic spraying. The coating compositions according to the invention can be used for coating substrates such as wood, glass, metal, paper or plastic.

The curing of the coatings can be carried out either by heating to temperatures from 130°–220° C., preferably 150°–190° C., or by the action of high-energy radiation such as UV or electron beams. In the case of crosslinking by UV-irradiation it is necessary to add photoinitiators to the coating compositions prior to homogenization. Suitable photoinitiators are the compounds conventionally employed as described, for example, in the monograph by J. Kosar, Light-Sensitive Systems, J. Wiley & Sons, New York–London, or as described in, for example, UV & EB Curing Formulations for Printing Inks, Coatings & Paints, ISBN 0 947798 02 1 or in DE-A 38 15 622.

When the aim is to obtain very smooth coatings or to powder-coat thermally sensitive material, it is also possible, and highly advantageous, to follow a procedure wherein, in a first step, the surface of the applied powder is melted using an IR-radiator until the material flows and then, in a second step, these powder coating melts can be cured using UV light or using electron beams.

Particularly suitable photoinitiators are those compounds which exist in free form and can be powdered. Examples of these are 1-hydroxycyclohexyl phenyl ketone, benzil dimethyl ketal or—in pigmented systems—2-methyl -1-[4-(methylthio)phenyl]-2-morpholino-1-propanol or trimethylbenzoyldiphenylphosphine oxide.

Also highly suitable are benzoin ethers such as benzoin isopropyl ether, benzil ketals such as benzil dimethyl ketal, and hydroxyalkylphenols such as 2-hydroxy-2-methyl-1-phenylpropan-1-one.

The said photoinitiators which, depending on the intended use of the compositions according to the invention, are employed in amounts of between 0.1 and 10% by weight, preferably 0.1 to 5% by weight, based on the weight of the binder, were used as the individual substance or else, on account of frequent advantageous synergistic effects, can be used in combination with one another.

If curing is carried out using electron beams, the energy applied is between 50 and 500 keV.

EXAMPLE I (unsaturated polyester)

850 parts of ethylene glycol and 1180 parts of terephthalic acid and 2 parts of dibutyltin oxide are heated in a water separator to 190°–200° C. After all of the terephthalic acid has dissolved, the mixture is cooled to 160° C., and 570 parts of maleic anhydride are 0.3 part of hydroquinone are added. The mixture is then again heated slowly to 195°–200° C. and stirred at this temperature until an acid number <25 mg of KOH/g is reached. The product is cooled to give a clear, solid, unsaturated polyester which has an acid number of 24 mg of KOH/g and a hydroxyl number of 36 mg of KOH/g. The melting point of the product is 88°–92° C.

EXAMPLE 2 (acrylate)

1470 parts of an isophoronediisocyanate containing isocyanurate groups (NCO content: 17.1%) are dissolved in 540 parts of acetone, and 1.1 parts of dibutyltin dilaurate and 5.3 parts of hydroquinone monomethyl ether are added. After heating to 50° C. 696 parts of hydroxyethyl acrylate are added dropwise, and the mixture is then stirred to an NCO content <0.3%.

The clear solution is diluted with a further 540 parts of acetone and is then added dropwise with vigorous stirring to 18 l of water; stirring is continued for 30 min, and the precipitate is filtered off with suction and dried at room temperature.

A white powder is obtained having a double bond content of 62%, a glass transition temperature of 55° C. and a melting point of 85°–90° C.

EXAMPLE 3 (acrylate)

corresponds to Example 1 from EP 0,410,242, using acetone instead of ethyl acetate. The procedure was otherwise as in Example 1.

The product has a double bond content of 4.8% and a glass transition temperature of 30° C.

Powder coating preparation and application

Example 1

558 parts of the unsaturated polyester from Example 1 and 372 parts of the acrylate from Example 2 are mixed with 40 parts Irgacure® 651 (commercial photoinitiator from Ciba-Geigy) and with 30 parts of Additol® XL 496 (commercial levelling agent from Hoechst AG), extruded and milled to give a powder having an average particle size of 50 μm.

After application to cleaned iron panels, the coating films are heated for 10 min at 140° C. and then irradiated with a UV-radiator (80 W/min, 10 cm distance, 10 m/min). A hard, solvent- and scratch-resistant coating is obtained.

Example 2

438 parts of the unsaturated polyester from Example 1, 292 parts of the acrylate from Example 2 and 200 parts of titanium dioxide are mixed with 40 parts Darocure® 64263 (commercial photoinitiator from Merck) and with 30 parts of Additol® XL 496 (commercial levelling agent from Hoechst AG), extruded and milled to give a powder having an average particle size of 50 μm.

After application to cleaned steel panels, the coating films are heated for 10 min at 140° C. and then irradiated with a UV-radiator (80 W/cm$^2$, 10 cm distance, 10 m/min). A hard, solvent- and scratch-resistant coating is obtained.

We claim:

1. In a method of forming a powder coating on a substrate by applying a coating of powder to a substrate and curing the same thermally or with electron beams or by high energy radiation or by irradiation with UV light, the improvement comprising using a binder in the powder which binder consists of A) solid unsaturated polyester and B) a polyurethane comprising (meth)acryloyl groups wherein the polyurethane B) is obtained by reacting B1) a polyisocyanate component comprising at least one organic polyisocyanate, B2) an alcohol component containing (meth)acryloyl groups, and comprising at least one mono- or polyhydric alcohol, and B3) a further structural component comprising at least one compound which is free from (meth)acryloyl groups and having groups which are reactive towards isocyanate groups, which is selected from the group consisting of ethylene glycol, 1,2- and 1,3-propane diol, neopentyl glycol, glycerol, trimethylol propane, tris hydroxyethyl isocyanurate, pentaerythritol and diethanolamine, polyamines, and amines containing hydroxyl groups in addition to secondary and primary amino groups.

2. The method of claim to wherein the substrate is selected from the group consisting of wood, glass, paper, metal and plastic.

3. The method of claim 1 wherein the powder contains pigments and additives.

4. The method of claim 1 wherein the powder on the substrate is melted by infrared irradiation before curing.

5. The method of claim 1 wherein the powder contains a photoinitiator.

6. The method of claim 1 wherein the binder consists of 10 to 95% by weight of component A) and 90 to 5% by weight of component B).

7. The method of claim 1 wherein component A) is the result of a condensation of polyhydric alcohols and unsaturated dicarboxylic acids or their anhydrides.

8. The method of claim 1 wherein saturated dicarboxylic acids are present in the condensation.

9. The method of claim 1 wherein component A) has a hydroxyl number of 5 to 120, an acid number of 2 to 60, a melting point of 50° to 130° C. and a viscosity of less than 100 Pas.

10. The method of claim 1 wherein component B) is obtained by reacting B1) 35 to 80 parts by weight of a polyisocyanate component comprising at least one organic polyisocyanate, B2) 15 to 70 parts by weight of an alcohol component containing (meth)acryloyl groups, and comprising at least one mono or polyhydric alcohol, and B3) 2 to 30 parts by weight of a further structural component which is free from (meth)acryloyl groups and having at least two groups which are reactive towards isocyanate groups.

11. The method of claim 1 wherein the coating is thermally cured.

12. The method of claim 1 wherein the coating is cured by high energy irradiation.

13. The method of claim 1 wherein the coating is cured by ultraviolet light.

14. The method of claim 1 wherein the coating is cured by irradiation with electron beams.

15. A substrate coated by the method of claim 1.

* * * * *